United States Patent
Zhang et al.

(10) Patent No.: US 9,771,055 B1
(45) Date of Patent: Sep. 26, 2017

(54) FRONT IMPACT MITIGATION SYSTEM FOR A VEHICLE AND METHOD

(71) Applicant: GM GLOBAL TECHNOLOGY OPERATIONS LLC, Detroit, MI (US)

(72) Inventors: Xian Zhang, Wixom, MI (US); Xiaofeng F. Song, Novi, MI (US); Paul A. Adam, Milford, MI (US); Dmitriy Feldman, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/340,556

(22) Filed: Nov. 1, 2016

(51) Int. Cl.
  *G06F 7/70* (2006.01)
  *G06F 19/00* (2011.01)
  *B60T 8/174* (2006.01)
  *B60W 40/10* (2012.01)
  *B60W 30/09* (2012.01)
  *G01S 13/93* (2006.01)

(52) U.S. Cl.
  CPC ........... *B60T 8/174* (2013.01); *B60T 2201/00* (2013.01); *B60T 2250/04* (2013.01); *B60W 30/09* (2013.01); *B60W 40/10* (2013.01); *G01S 2013/9378* (2013.01)

(58) Field of Classification Search
  USPC .............. 701/70, 45, 96, 301; 180/274–275; 340/436
  See application file for complete search history.

(56) References Cited

U.S. PATENT DOCUMENTS

| 6,185,490 B1 * | 2/2001 | Ferguson | G07C 5/0858 369/21 |
| 6,746,078 B2 * | 6/2004 | Breed | B60N 2/002 297/216.1 |
| 7,197,396 B2 * | 3/2007 | Stopczynski | B60W 30/09 340/436 |

(Continued)

FOREIGN PATENT DOCUMENTS

| EP | 2196361 B1 * | 11/2013 | ......... B60R 21/0136 |
| JP | 6107839 B2 * | 4/2017 | ......... B60R 21/0132 |

OTHER PUBLICATIONS

Quick and Autonomous Platoon Maintenance in Vehicle Dynamics for Distributed Vehicle Platoon Networks; Ankur Sarker; Chenxi Qiu; Haiying Shen; 2017 IEEE/ACM Second International Conference on Internet-of-Things Design and Implementation (IoTDI) Year: 2017; pp. 203-208.*

The research on the vehicle collision avoidance control based on vehicle motion estimation; Ren Yue; Zheng Ling; Li Zhe; Yang Wei; Li Yinong; Wang Ke; Li Yusheng; Xiong Zhoubing; IET International Conference on Intelligent and Connected Vehicles (ICV 2016); Year: 2016; pp. 1-6, DOI: 10.1049/cp.2016.1154.*

(Continued)

*Primary Examiner* — Cuong H Nguyen
(74) *Attorney, Agent, or Firm* — Reising Ethington, P.C.

(57) ABSTRACT

A front impact mitigation system for a host vehicle and a method for operating a front impact mitigation system. The front impact mitigation system can take into account the position of a rear object that trails the host vehicle to develop a modified front impact mitigation control signal that at least partially mitigates the likelihood of certain rear impact collisions between the rear object and the host vehicle when the host vehicle is responding to the presence of an impending leading obstacle. A modified front impact mitigation control signal may be developed to account for the speed of the host vehicle and the distance that the rear object trails the host vehicle.

14 Claims, 15 Drawing Sheets

(56) References Cited

U.S. PATENT DOCUMENTS

| | | | | |
|---|---|---|---|---|
| 8,191,667 | B2* | 6/2012 | Stabrey | B60T 7/22 |
| | | | | 180/274 |
| 8,924,085 | B2* | 12/2014 | Baumann | B60N 2/42745 |
| | | | | 701/45 |
| 9,090,203 | B2* | 7/2015 | Seifert | G08G 1/166 |
| 2006/0125616 | A1* | 6/2006 | Song | B60Q 1/38 |
| | | | | 340/463 |
| 2006/0186713 | A1* | 8/2006 | Breed | B60N 2/0232 |
| | | | | 297/216.12 |
| 2011/0077826 | A1* | 3/2011 | Baumann | B60N 2/42745 |
| | | | | 701/45 |
| 2013/0311043 | A1* | 11/2013 | Kobana | B60J 7/22 |
| | | | | 701/41 |
| 2014/0368324 | A1* | 12/2014 | Seifert | G08G 1/166 |
| | | | | 340/435 |

OTHER PUBLICATIONS

Optimizing Departures of Automated Vehicles From Highways While Maintaining Mainline Capacity; Eric Meissner; Thidapat Chantem; Kevin Heaslip; IEEE Transactions on Intelligent Transportation Systems; Year: 2016, vol. 17, Issue: 12 pp. 3498-3511, DOI: 10.1109/TITS.2016.2561203.*

Optimal control based approach for autonomous driving; Reza Dariani; Stephan Schmidt; Roland Kasper; 2016 IEEE 21st International Conference on Emerging Technologies and Factory Automation (ETFA); Year: 2016, pp. 1-8, DOI: 10.1109/ETFA.2016.7733718.*

Filzek and Breuer, Distance Behaviour on Motorways With Regard to Active Safety—A Comparison Between Adaptive-Cruise-Control (ACC) and Driver, Automotive Engineering Department, Darmstadt University of Technology, Germany, Paper No. 201.

* cited by examiner

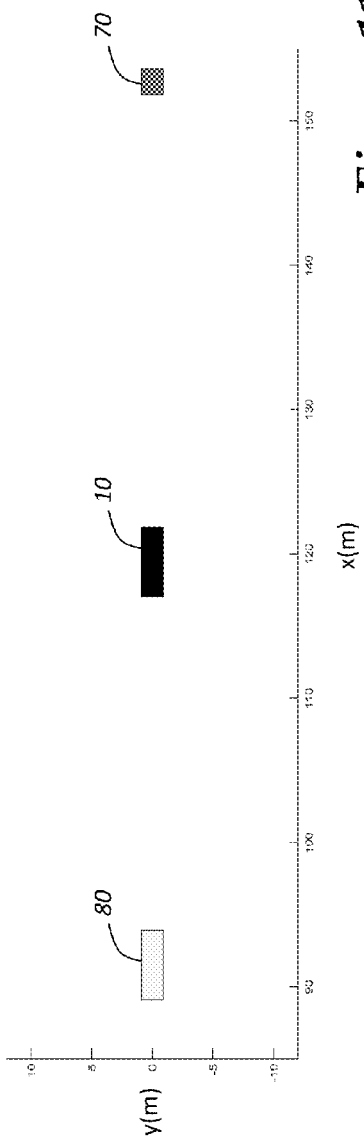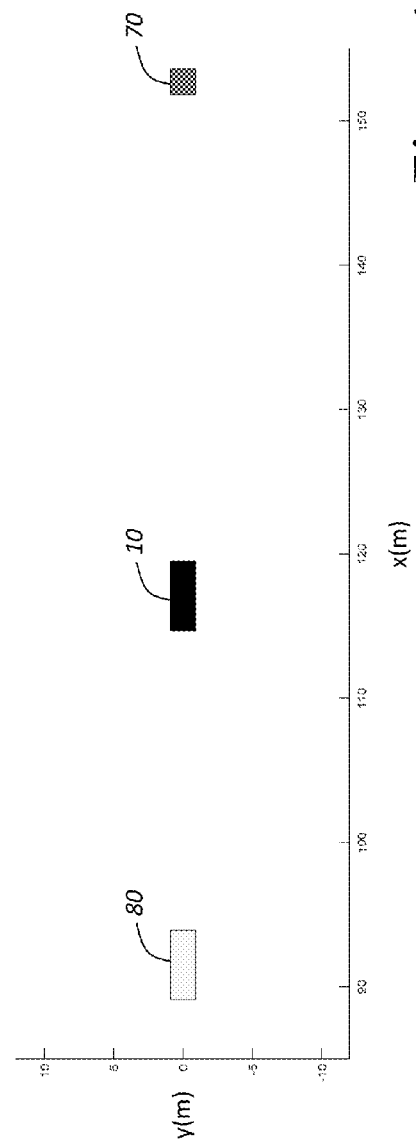

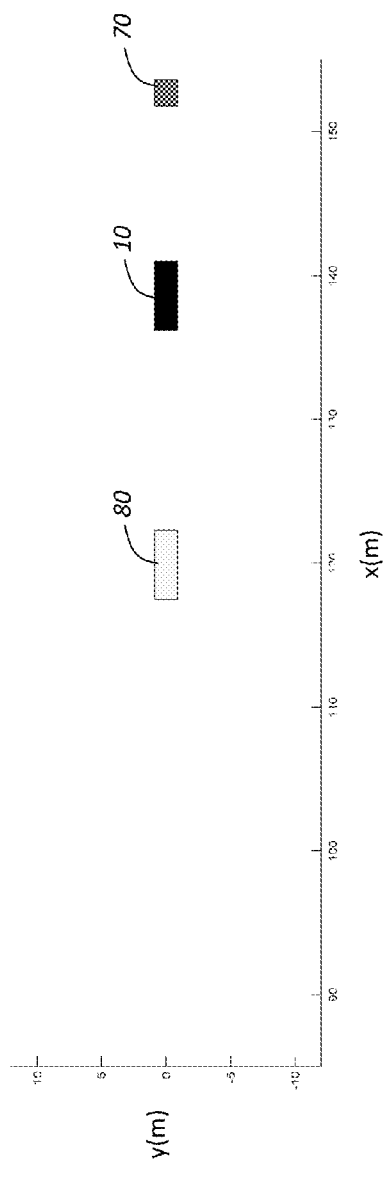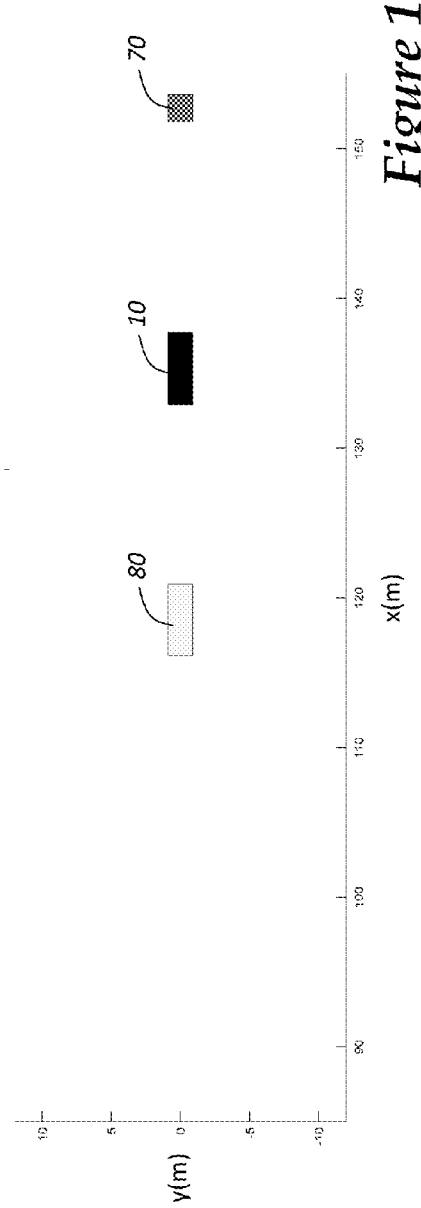

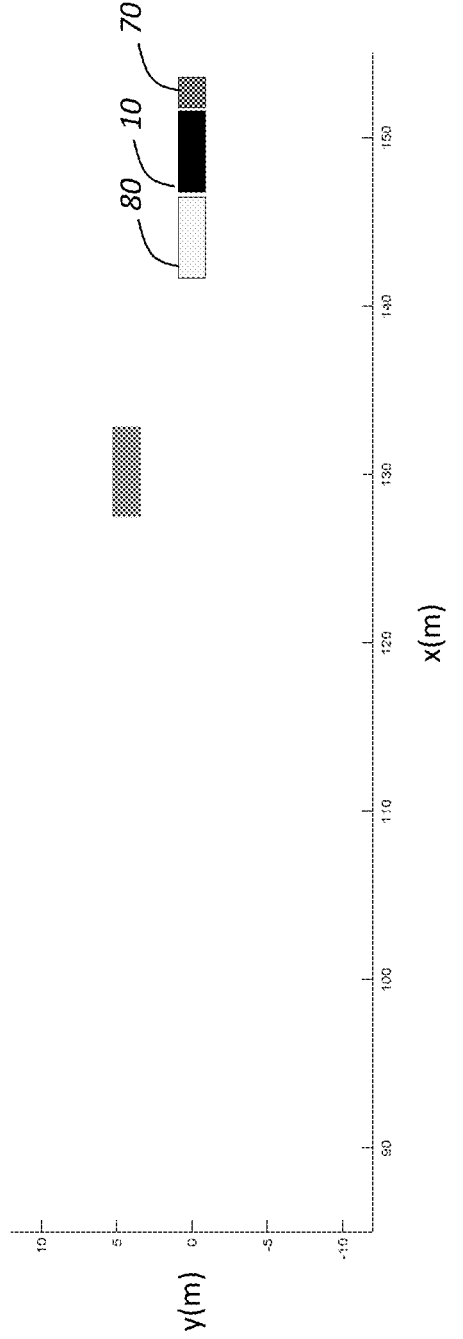

FRONT IMPACT MITIGATION SYSTEM FOR A VEHICLE AND METHOD

FIELD

The present invention generally relates to a front impact mitigation (FIM) system and a method of operating a front impact mitigation system for a vehicle, and more particularly, to a system and method that at least partially mitigates the likelihood of certain rear collisions when operating the front impact mitigation system.

BACKGROUND

While it is a goal in at least some front impact mitigation (FIM) systems to minimize intrusiveness to normal driving, such minimization may not be desirable in all instances, as it could impact the likelihood of a rear end collision at the host vehicle. For example, crash imminent braking (CIB) features of an FIM system can intervene in situations when a host vehicle is on track to collide with an obstacle in front of the vehicle. In such situations, some CIB features will intervene at a point when it is no longer possible for the driver to brake or otherwise avoid the impending collision with the obstacle. However, the braking force required and/or time-to-collision at this point may increase the likelihood that a trailing rear object will hit the host vehicle upon activation of the CIB feature.

SUMMARY

According to one embodiment, there is provided a method for operating a front impact mitigation system of a host vehicle. The method comprises the steps of receiving a host vehicle speed signal at a control unit that is representative of a host vehicle speed; receiving a rear object distance signal at the control unit that is representative of a distance that a rear object trails the host vehicle; and using the host vehicle speed signal and the rear object distance signal to develop a modified front impact mitigation control signal at the control unit. The modified front impact mitigation control signal is modified from a standard front impact mitigation control signal to at least partially mitigate a likelihood of a significant rear impact collision at the host vehicle by the rear object during operation of the front impact mitigation system.

According to another embodiment, there is provided a method for operating a front impact mitigation system of a host vehicle. The method comprises the steps of determining whether a rear object is trailing the host vehicle; and when a rear object is trailing the host vehicle, obtaining a modified time-to-collision calculation for a leading obstacle. The modified time-to-collision value calculation uses an adjusted deceleration value. The method further comprises the step of using the modified time-to-collision value as a modified front impact mitigation control signal to control one or more aspects of the front impact mitigation system.

According to another embodiment, there is provided a front impact mitigation system for a host vehicle. The system comprises a host vehicle speed sensor configured to determine a host vehicle speed; an object detection sensor configured to determine a distance that a rear object trails the host vehicle; and a control unit coupled to the host vehicle speed sensor and the object detection sensor. The control unit is configured to develop a modified front impact mitigation control signal based at least partially on the host vehicle speed and the distance that the rear object trails the host vehicle. The modified front impact mitigation control signal is modified from a standard front impact control signal to at least partially mitigate a likelihood of a significant rear impact collision at the host vehicle by the rear object during operation of the front impact mitigation system.

DRAWINGS

Preferred exemplary embodiments will hereinafter be described in conjunction with the appended drawings, wherein like designations denote like elements, and wherein.

Figure 1:
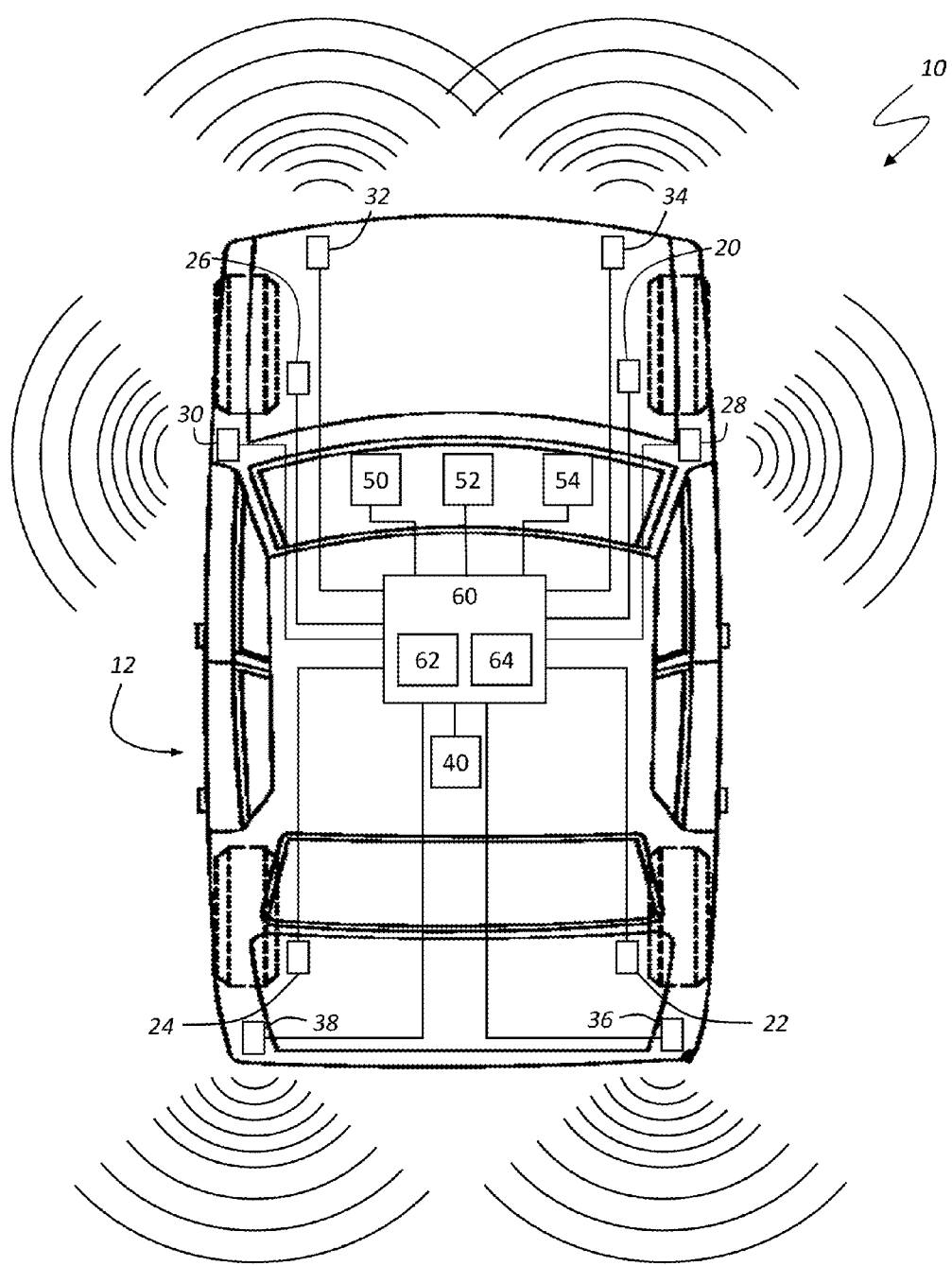
FIG. 1 is a schematic view of a host vehicle having an exemplary front impact mitigation (FIM) system in accordance with one embodiment.
Figure 10:
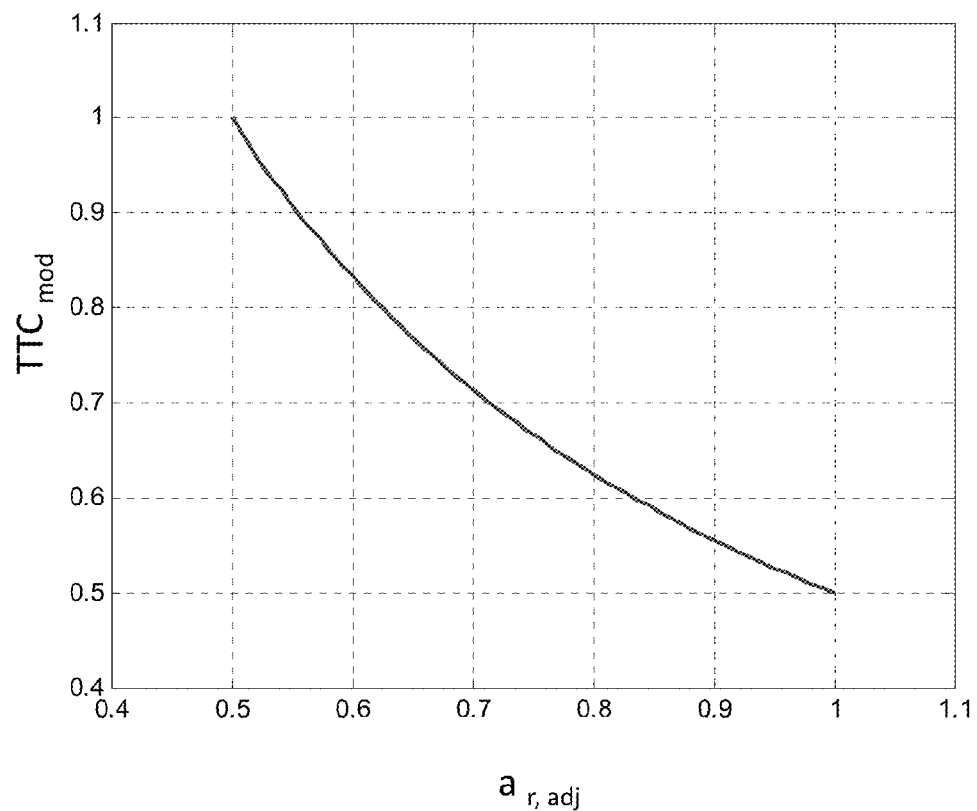
Figure 13A:
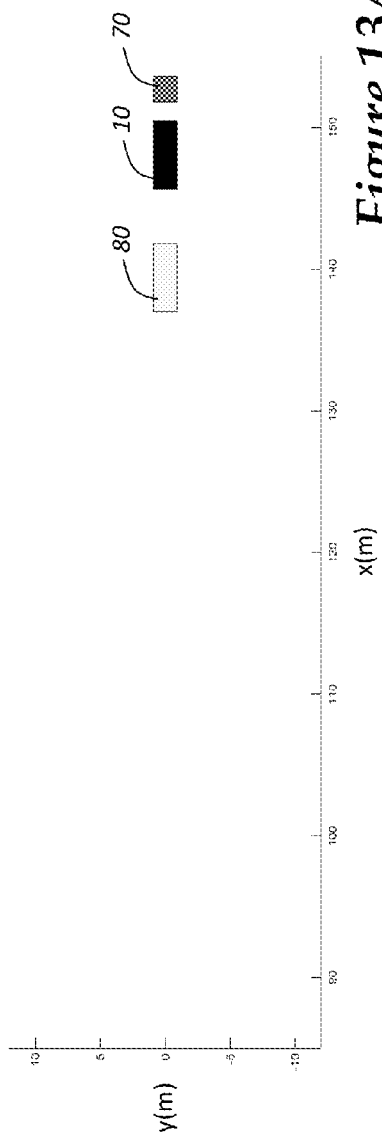
Figure 13B:
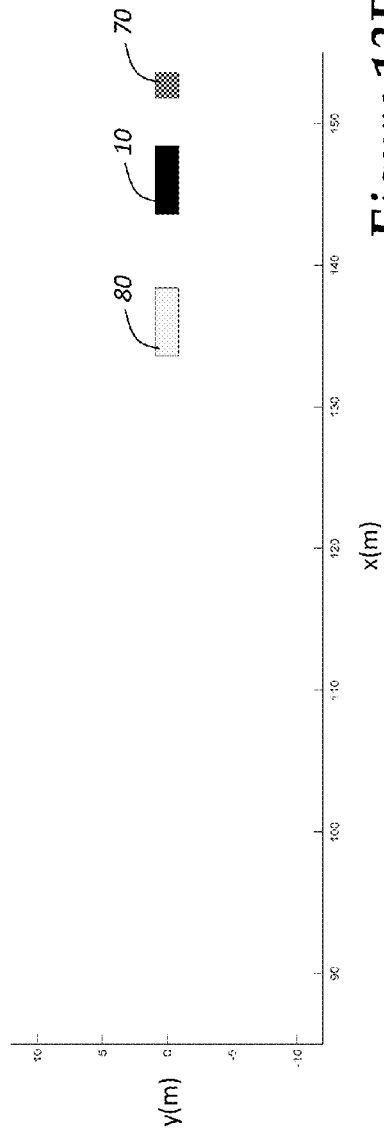
Figure 14A:
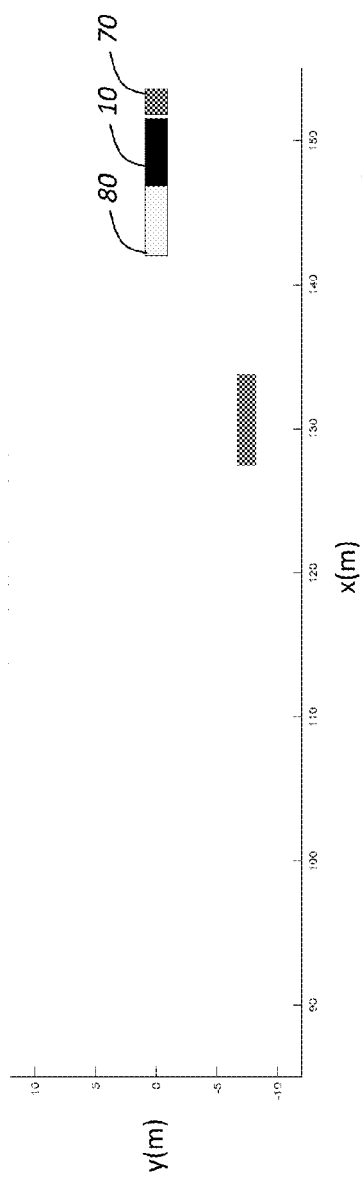
Figure 14B:
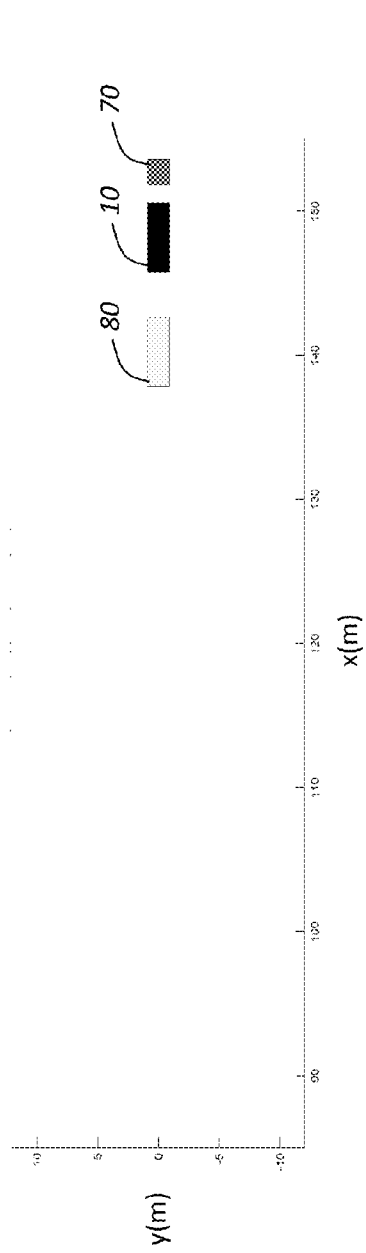

FIG. 10 is a graph comparing an adjusted acceleration with a modified time-to-collision value; and FIGS. 11A, 11B, 12A, 12B, 13A, 13B, 14A, 14B, and 15 are still shots of an animation comparing the use of a standard FIM control signal (FIGS. 11A, 12A, 13A, and 14A) and a modified FIM control signal (FIGS. 11B, 12B, 13B, 14B, and 15) for a crash imminent braking feature of an FIM system, such as the FIM system illustrated in FIG. 1.

DESCRIPTION

The system and method described herein can help optimize front impact mitigation (FIM) performance by leveraging both front and rear object sensing capability. According to one embodiment, the system and method may use input such as the host vehicle speed and the following distance of one or more trailing rear objects to develop a modified FIM control signal. In a particular example, the modified FIM control signal is a modified time-to-collision (TTC) value that can be used to enhance active safety performance and advantageously minimize potential risks of certain rear collisions at the host vehicle. Since many FIM systems, and more particularly, crash imminent braking (CIB) features of such FIM systems, are calibrated to avoid intrusiveness, last minute or aggressive braking may occur to avoid or mitigate a collision between the host vehicle and a leading obstacle. However, rear end collisions at the host vehicle by one or more trailing objects should also be considered. The FIM system and method herein may alter one or more aspects of an FIM control signal to compensate for the existence and/or position of one or more trailing rear objects. In one example, the FIM control signal may be a TTC or following distance calculation that is altered to minimize front impact energy while avoiding or mitigating a potential significant rear end collision at the host vehicle. The FIM system and method may be advantageous for use with active cruise control systems or autonomous driving systems.

With reference to FIG. 1, there is shown a schematic representation of an exemplary host vehicle 10 equipped with an FIM system 12 capable of developing a modified FIM control signal that can help to at least partially mitigate the likelihood of certain rear impact collisions at the host vehicle by a trailing rear object during operation of the FIM system. It should be appreciated that the FIM system and method may be used with any type of vehicle, including traditional passenger vehicles, sports utility vehicles (SUVs), cross-over vehicles, trucks, vans, buses, recreational vehicles (RVs), motorcycles, etc. These are merely some of the possible applications, as the FIM system and method described herein are not limited to the exemplary embodiment shown in FIG. 1 and could be implemented with any number of different vehicles. According to one embodiment, the FIM system 12 includes host vehicle speed sensors 20-26, object detection sensors 28-38, warning device 40, and control units 50-54 and 60.

Any number of different sensors, components, devices, modules, systems, etc. may provide the FIM system 12 with information, data and/or other input. These include, for example, the exemplary components shown in FIG. 1, as well as others that are known in the art but are not shown here. It should be appreciated that the speed sensors, object detection sensors, control units, warning devices, as well as any other component that is a part of and/or is used by the FIM system 12 may be embodied in hardware, software, firmware or some combination thereof. These components may directly sense or measure the conditions for which they are provided, or they may indirectly evaluate such conditions based on information provided by other sensors, components, devices, modules, systems, etc. Furthermore, these components may be directly coupled to the control unit 60, as schematically illustrated, indirectly coupled via other electronic devices, a vehicle communications bus, network, etc., or coupled according to some other arrangement known in the art. One or more of these components, units, subsystems, etc., may be integrated within another vehicle component, device, module, system, etc. (e.g., sensors that are already a part of an active safety system, an active cruise control (ACC) system, an engine control module (ECM), traction control system (TCS), electronic stability control (ESC) system, antilock brake system (ABS), etc.), they may be stand-alone components (as schematically shown in FIG. 1), or they may be provided according to some other arrangement. In some instances, multiple sensors might be employed to sense a single parameter (e.g., for providing redundancy). It should be appreciated that the foregoing scenarios represent only some of the possibilities, as any type of suitable arrangement or architecture may be used to carry out the method described herein. In a preferred embodiment, the FIM system 12 is an active safety system and the control unit 60 is some type of active safety control unit or controller, but this is not required.

The host vehicle speed sensors 20-26 may include any type of sensing or other component that provides the present system and method with data or information regarding the speed of the host vehicle 10. The speed sensors 20-26 provide the system 12 with host vehicle speed signals that are indicative of the rotational speed of the wheels, and hence the overall speed or velocity of the vehicle. In one embodiment, individual wheel speed sensors 20-26 are coupled to each of the vehicle's four wheels and separately provide speed readings indicating the rotational velocity of the corresponding wheel (e.g., by counting pulses on one or more rotating wheel(s)). Skilled artisans will appreciate that these sensors may operate according to optical, electromagnetic or other technologies, and that speed sensors 20-26 are not limited to any particular speed sensor type. In another embodiment, the speed sensors could be coupled to certain parts of the vehicle, such as an output shaft of the transmission or behind the speedometer, and produce speed readings from these measurements. It is also possible to derive or calculate speed readings from acceleration readings (skilled artisans appreciate the relationship between velocity and acceleration readings). In another embodiment, speed sensors 20-26 determine vehicle speed relative to the ground by directing radar, laser and/or other signals towards the ground and analyzing the reflected signals, or by employing feedback from a navigation unit that has Global Positioning System (GPS) capabilities. It is possible for the speed readings to be provided to the system 12 by some other module, subsystem, system, etc., like a dynamic sensing unit, a powertrain control unit, or a brake control unit, to cite a few examples. Any other known speed sensing techniques may be used instead.

Object detection sensors 28-38 provide the system 12 with object readings that pertain to nearby vehicles, pedestrians, or other objects or obstacles surrounding the host vehicle 10. The object readings can be representative of the presence, position, velocity, and/or acceleration of nearby vehicles, as well as of nearby other objects. These readings may be absolute in nature (e.g., an object velocity or acceleration relative to ground or some other frame of reference) or they may be relative in nature (e.g., an object velocity or acceleration relative to the host vehicle). Each of the object sensors may be a single sensor or a combination of sensors, and may include one or more RADAR devices, laser devices, LIDAR devices, ultrasound devices, vision devices (e.g., camera, etc.), vehicle-to-vehicle communications devices, devices for receiving communications from roadside beacons or sensors, other known devices or combinations thereof. According to an exemplary embodiment, object detection sensors 28 and 30 are sideways-looking sensors that are mounted on the sides of the vehicle 10, object detection sensors 32 and 34 are forward-looking sensors that are mounted towards the front of the vehicle and are capable of monitoring areas that are generally ahead of and off to the side of the host vehicle 10, while object detection sensors 36 and 38 are rearward- or sideways-looking sensors that are mounted towards the rear or side of the vehicle and are able to monitor areas generally behind the vehicle or off to its side. Of course, the host vehicle 10 may include a combination of object detection sensors that differs from the exemplary combination shown in FIG. 1, as that embodiment is only meant to illustrate one possibility. For example, there could be less object detection sensors than illustrated, there could be more than illustrated, or they could be configured and/or arranged differently.

The aforementioned host vehicle speed sensors 20-26 and object detection sensors 28-38 may provide input to the FIM system 12 in a manner that helps enable the method described below to generate one or more FIM control signals that can control various aspects of the FIM system. Moreover, as described above, the FIM system itself may be part of or integrated with another vehicle system, such as an active safety system, an active cruise control (ACC) system, or any other vehicle system or subsystem, and can thereby effectuate various control responses if the host vehicle 10 is about to experience a collision. The description of the FIM system 12 now turns to various output devices, such as warning device 40 and control units 50-54 and 60, which can be used to carry out the present method.

Warning devices 40 may include any type of output device or other component that can be used to inform, alert and/or otherwise warn the driver of an impending collision. Some examples of potential warning devices include visual warning devices, audible warning devices, haptic warning devices and other miscellaneous warning devices, and each of these devices can receive control signals from the system 12 for their activation. Other types of warning devices are certainly possible, as the present system and method are not limited to any particular ones.

Control units 50-54 may include any control units or modules within the host vehicle 10 that can perform autonomous, semi-autonomous and/or other automated driving actions in response to control signals from system 12. "Automated driving action," as used herein, broadly means any driving-related action or function that is automatically taken by the host vehicle without driver request and includes actions falling within levels 1-4 of the National Highway Traffic Safety Administration (NHTSA) classification system. To illustrate, a powertrain or engine control unit 50 may be used to automatically control the speed of the vehicle, while a brake control unit 52 and a steering control unit 54 can be used to control braking and steering, respectively. Other control units may certainly be used, as the preceding examples are just meant to illustrate some of the possibilities. Skilled artisans will appreciate that it is possible for one or more of the control units 50-54 to constitute or include some of the vehicle sensors described above. For instance, an engine control unit 50 could operate as both a speed sensor (input device that provides the system with speed readings regarding engine and/or vehicle speed), as well as a control unit (output device that controls engine and/or vehicle speed in response to control signals during an automated driving event). The same is true regarding the brake and steering control units 52 and 54, in terms of acting as both input and output devices to the FIM system 12.

Control unit 60 is coupled to the host vehicle speed sensors 20-26, object detection sensors 28-38, the warning devices 40, and the various control units 50-54 so that it can gather sensor readings from the sensors and provide control signals to the warning devices and control units according to the present method. Control unit 60 may include any variety of electronic processing devices, memory devices, input/output (I/O) devices, and/or other known components, and may perform various control and/or communication related functions. In an exemplary embodiment, control unit 60 is some type of ACC or active safety control module and includes an electronic memory device 62 that stores sensor readings (e.g., sensor readings or signals from sensors 20-38), look up tables or other data structures, algorithms (e.g., the algorithm embodied in the exemplary method described below), etc. Control unit 60 also includes an electronic processing device 64 (e.g., a microprocessor, a microcontroller, an application specific integrated circuit (ASIC), etc.) that executes instructions for software, firmware, programs, algorithms, scripts, etc. that are stored in memory device 62 and may partially govern the processes and methods described herein.

Depending on the particular embodiment, the control unit 60 may be a stand-alone vehicle electronic unit or module (e.g., a safety controller, a sensor controller, etc.), may be incorporated or included within another vehicle electronic unit or module (e.g., an automated driving control unit, an active safety control unit, a brake control unit, a steering control unit, a powertrain control unit, etc.), or may be part of a larger network or system (e.g., an automated driving system, an adaptive cruise control system, a lane departure warning system, an active safety system, a traction control system (TCS), an electronic stability control (ESC) system, an antilock brake system (ABS), etc.), to name a few possibilities. Accordingly, the control unit 60 is not limited to any one particular embodiment or arrangement and may be used by the present method to control one or more aspects of vehicle operation.

Any of the aforementioned control units may include a combination of electronic processing devices, memory devices, input/output (I/O) devices, and other known components, and they may be electronically connected to other vehicle devices and modules via a suitable vehicle communications network, and may interact with them when required. It should be appreciated that the basic architecture, structure and overall arrangement of such control units are well known in the art and are, therefore, not described here in further detail.

Figure 2:
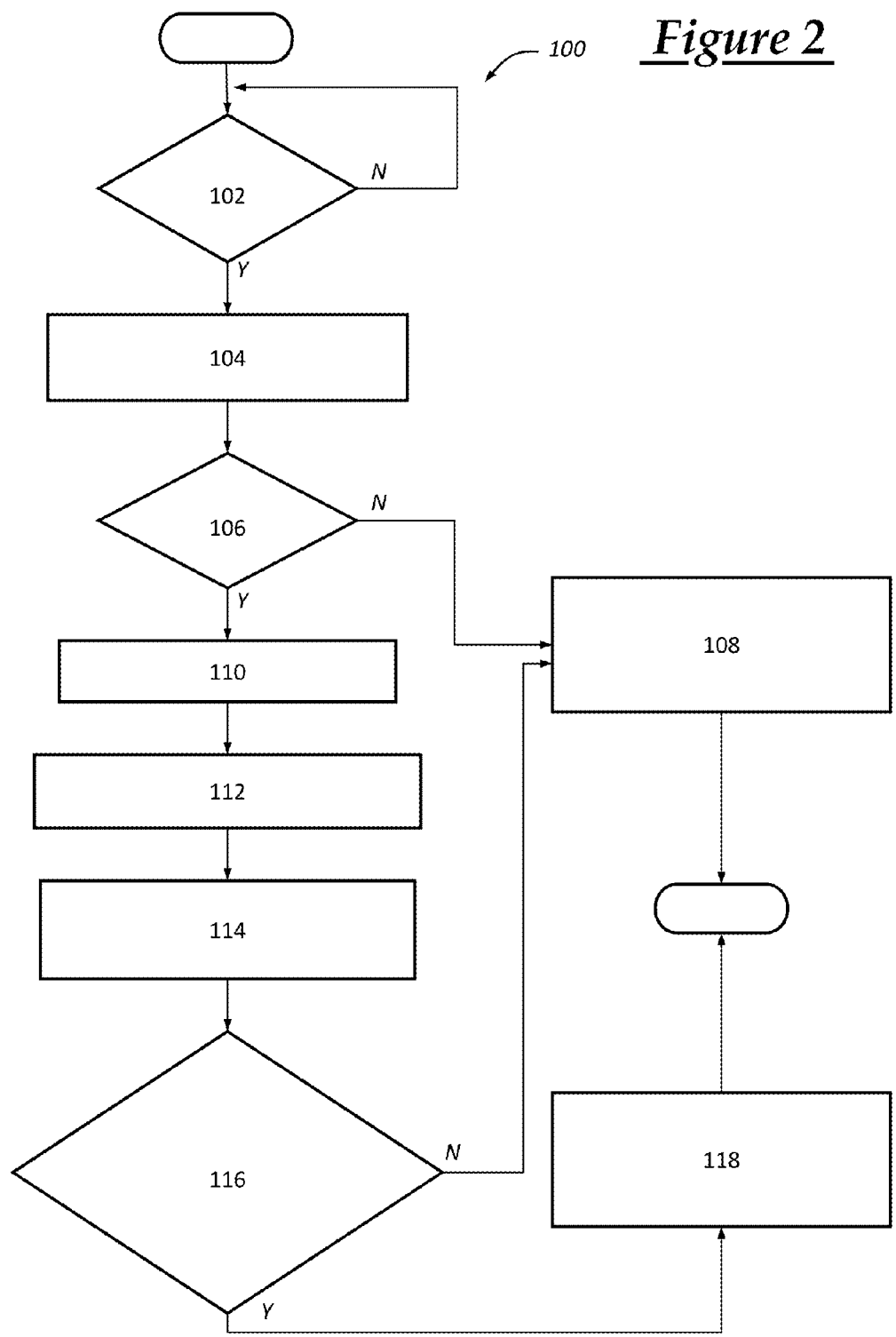
FIG. 2 is a flowchart illustrating an exemplary method for operating an FIM system, such as the system shown in FIG. 1.

Turning now to FIG. 2, there is shown an embodiment of an operating method 100 for a vehicle control system, such as FIM system 12 shown in FIG. 1. If a trailing rear object is detected when a collision with a leading obstacle is likely, the method 100 may develop a modified FIM control signal to at least partially mitigate the likelihood of certain rear impact collisions at the host vehicle by the rear object during operation of the FIM system 12. According to one embodiment, the modified FIM control signal is influenced by some combination of readings from host vehicle speed sensors 20-26 and object detection sensors 28-38, and can result in modified control signals that are sent to some combination of warning devices 40 and/or control modules 50-54. The following description is provided in the context of vehicles equipped with autonomous, semi-autonomous and/or other automated driving capabilities, such as vehicles with a crash imminent braking (CIB) feature, but the method 100 may also be used with vehicles lacking such features. For example, if a significant rear impact collision is likely at the host vehicle when approaching a leading obstacle, the method 100 could activate a warning to the driver at an earlier time than what would normally be activated to account for the trailing rear object. Accordingly, the present method is not limited to the braking example provided below, and may impact other control or warning actions.

Beginning with step 102, the method determines whether a leading obstacle is present. This step may be accomplished, for example, via one or more object detection sensors, such as object detection sensors 28-34 on host vehicle 10. In one embodiment, forward-looking object detection sensors 32, 34 may detect the presence of a leading obstacle. In another embodiment, sideways-looking object detection sensors 28, 30 may indicate, based on an obstacle's speed and trajectory, that an obstacle, although not directly in front of host vehicle 10, may soon become a leading obstacle. Alternatively, or as a redundancy to readings from object detection sensors, other methods of determining or confirming the presence of a leading obstacle may be used. To cite one example, step 102 may be accomplished via a vehicle-to-vehicle communications system or the like. A leading obstacle may include any object or threat to a host vehicle that triggers action from the FIM system 12, such as another vehicle, a pedestrian, a red light or stop indicator, an object in the road or off the road depending on the host vehicle's trajectory, etc. If there is no leading obstacle present, the FIM system 12 will continue to monitor for a leading obstacle. If there is a leading obstacle present, the method will continue to step 104.

In step 104, the method 100 develops a standard FIM control signal. The FIM control signal may be a signal, reading, value, etc. that is used directly or indirectly to influence and/or control one or more aspects of the FIM system 12. In a preferred example, the FIM control signal is a time-to-collision (TTC) value. The standard TTC value may be calculated in accordance with the following equation:

$$TTC_0 = -\frac{r_o}{\dot{r}_o} \quad \text{(Equation 1)}$$

where is $r_o$ the range between the host vehicle and the leading obstacle and $\dot{r}_o$ is the relative speed. This equation ignores the relative acceleration; however, it is possible to alternatively use the acceleration as skilled artisans will appreciate. Relative acceleration is ignored in this example because with FIM systems, a chain event is typically occurring. Accordingly, the host vehicle brakes so quickly that a maximum deceleration is used (e.g., 1 g), which will not vary or will only slightly vary the calculation. If the system is designed to account for the relative acceleration ($a_r$), the following equation may be implemented as an alternative:

$$r(t) = r_o + \int_0^t \dot{r} dt = r_o + \frac{1}{2}a_r t^2 + \dot{r}_0 t \quad \text{(Equation 2)}$$

Continuing with Equation 1 and the example provided above, a safe following distance to avoid a collision with the leading object may be calculated as follows, in accordance with Equation 3, where $a_{r,max}$ is the deceleration needed by the host vehicle to avoid a collision with the leading obstacle:

$$r_o \geq \frac{(-\dot{r}_0)^2}{2a_{r,max}} \quad \text{(Equation 3)}$$

When considered in terms of TTC, it is preferable to maintain TTC at or above the safe following distance such that:

$$TTC_0 = \frac{-r_0}{\dot{r}_0} \geq \frac{-\dot{r}_0}{2a_{r,max}} \quad \text{(Equation 4)}$$

The TTC value is typically used by one or more vehicle control units in various vehicle systems as a following distance calculation (e.g., the time it would take for a collision with the leading obstacle given the current speeds, distances, and trajectories). The TTC or FIM control signal may be used by a warning device 40 to provide a warning to the driver or activate advanced restraints, for example, by an engine control unit 50 or brake control unit 52 such as with a CIB feature, by control unit 60 in various calculations used in one or more vehicle subsystems, or any other feasible implementation. As will be described in further detail below, in one embodiment, step 104 may be optional, and an FIM control signal may be developed that always takes into account a rear object, instead of developing a standard FIM control signal that does not take into account a rear object and a separate modified FIM control signal that takes into account a rear object. The standard FIM control signal typically takes into account information with regard to the leading obstacle detected in step 102. In one embodiment, the standard FIM control signal does not account for trailing rear objects, as will be detailed further below. However, it is possible for the standard FIM control signal to take into account information with regard to other things, such as whether an open steering lane is available to avoid the leading obstacle, etc. Furthermore, the information used to determine the standard FIM control signal will depend on its desired implementation. For example, if the standard FIM is a standard TTC, the development of the control signal will likely account for the current speed of both the leading obstacle and the host vehicle (or their relative speed), their distance, and in some embodiments, trajectories.

Step 106 asks whether a rear object is present. Like step 102, this step may be accomplished, for example, via one or more object detection sensors, such as object detection sensors 28, 30, 36, 38 on host vehicle 10. In one embodiment, rearward-looking object detection sensors 36, 38 may detect the presence of a rear object. In another embodiment, sideways-looking object detection sensors 28, 30 may indicate, based on an obstacle's speed and trajectory, that an obstacle, although not directly behind host vehicle 10, may soon become a trailing rear object. Alternatively, or as a redundancy to readings from object detection sensors, other methods of determining or confirming the presence of a leading obstacle may be used. To cite one example, step 106 may be accomplished via a vehicle-to-vehicle communications system or the like. A rear object may include any trailing object or threat to a host vehicle that triggers action from the FIM system 12, such as another vehicle or an object trailing the host vehicle 10 that may collide with the host vehicle if the host vehicle were to make a quick stop, for example. If there is no trailing rear object present, the method 100 may continue to step 108, which involves using the standard FIM control signal developed in step 104 to control one or more aspects of the FIM system 12. If there is a trailing rear object, the method 100 may continue to step 110-114 which involve the development of a modified FIM control signal that accounts for the position, speed, and/or presence of the rear object detected in step 106.

Step 108 of the method 100 involves a situation when a trailing rear object is not present. In such an instance, step 108 uses the standard FIM control signal developed in step 104 to control one or more aspects of the FIM system 12. The aspects of the FIM system 12 which are controlled in step 108 will likely depend on the type of FIM control signal that is developed. According to one embodiment, the standard FIM control signal is a TTC used by one or more aspects of the FIM system 12. The TTC may be used to determine when or what warnings will be issued to the driver, such as via warning device 40. The TTC may be used to determine when to activate a CIB feature. Determining when and/or how the brakes are applied, such as via brake control unit 52 (e.g., by initiating a brake pre-fill to increase brake pressure, activating autonomous braking, brake assist, or pre-brake, etc.), the FIM system 12 will usually evaluate the TTC, and in some instances, the amount of impact speed reduction that is desired. Typically, the brake force applied is constant (e.g., 1 g) and is applied at or below a certain TTC threshold. Further, typical CIB features are designed so as to avoid intrusiveness, by activating braking once the TTC threshold is established (e.g., applying 1 g or a max braking level at a minimum time that the host vehicle driver can decelerate or steer to avoid the collision). While the examples below are focused primarily on the TTC calculation for a CIB feature of an FIM system, it should be understood that other FIM control signals or aspects of the FIM system may be controlled, depending on the desired system and method implementation.

If in step 106, the method 100 determines that a rear object is present, the method may move to steps 110-114 to develop a modified FIM control signal that at least partially accounts for the presence of one or more trailing rear objects. As previously mentioned, it may be possible in some implementations of method 100 for standard FIM control signal to be altered to account for the presence of a rear object, instead of developing two separate FIM control signals which are subsequently compared or evaluated. In such an example, the modified FIM control signal, which is detailed below, would be the FIM control signal used to control one or more aspects of the FIM system 12. Other modifications are certainly possible.

Step 110 involves determining a host vehicle speed. This may be a separate and distinct step, or it may have been accomplished in step 104 in the development of the standard FIM control signal, for example. In one embodiment, speed sensors 20-26 are used to directly or indirectly determine the host vehicle speed. However, as described above, it is possible for host vehicle speed readings to be provided to the system 12 by some other unit, module, subsystem, system, etc., like a dynamic sensing unit, a powertrain control unit, or a brake control unit, to cite a few examples. Any other known speed sensing techniques may be used instead or in addition to those described.

Step 112 involves determining a distance that the rear object trails the host vehicle. This may be accomplished via the object detection sensors directly, such as object detection sensors 36, 38 for example, or via another feasible implementation, such as information discerned from GPS or a vehicle-to-vehicle communications system. Also, the object detection sensors may provide information to one or more control units that perform various calculations to determine the distance that the rear object trails the host vehicle, such that the object detection sensors indirectly determine the distance.

Figure 3:
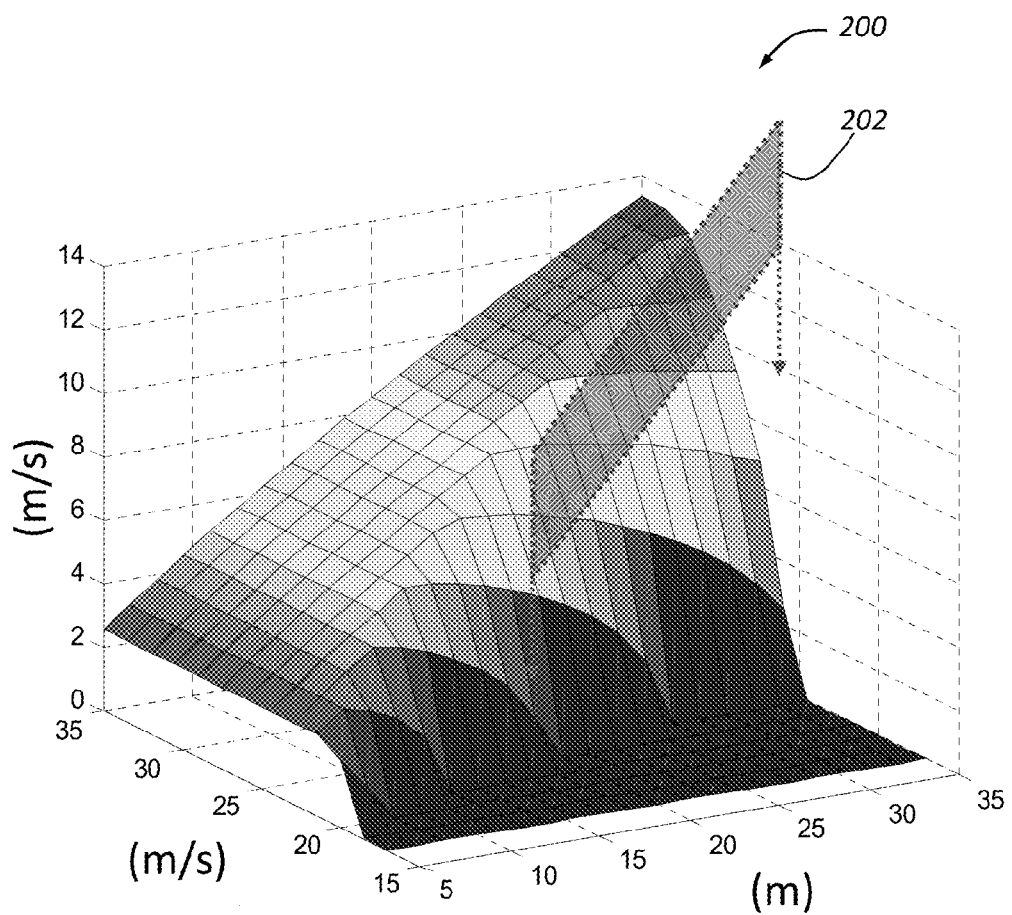
FIGS. 3-7 are various graphs that may be used to determine whether a significant rear collision is likely with a rear object and a host vehicle.
Figure 4:
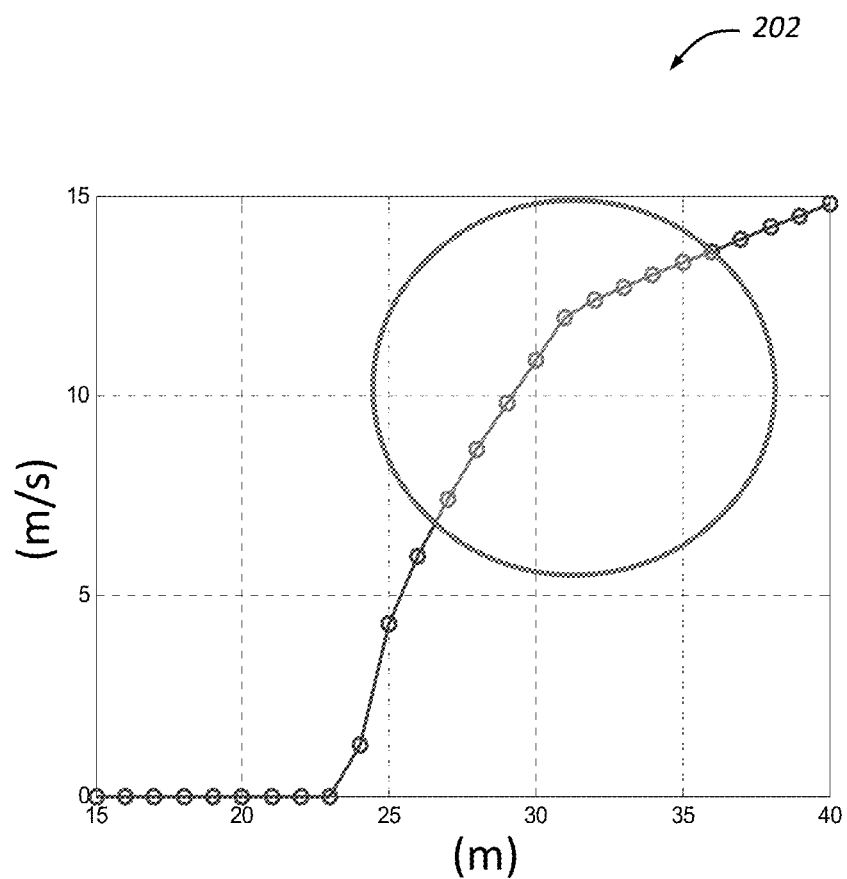
Figure 5:
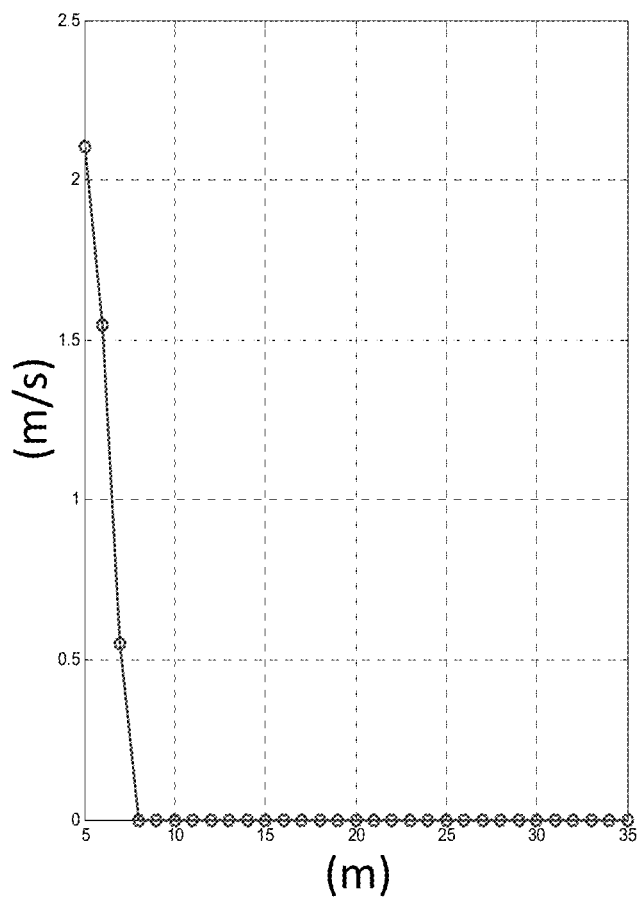
Figure 6:
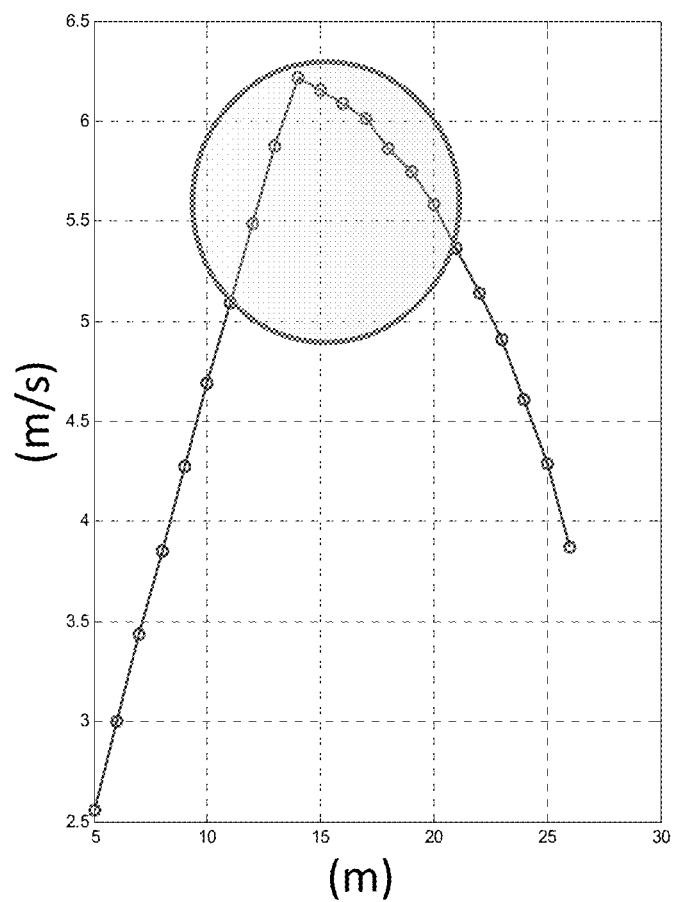
Figure 7:
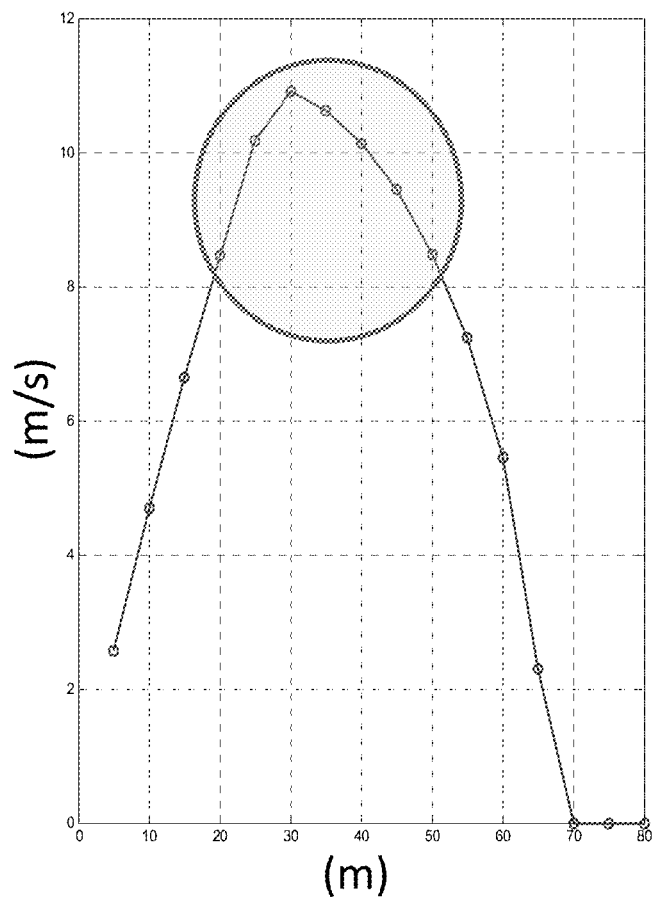

Step 114 uses the host vehicle speed and the rear object distance to develop a modified FIM control signal. The modified FIM control signal takes into account a trailing rear object, instead of being solely or primarily focused on avoiding a collision with the leading obstacle. In accordance with one embodiment, the modified FIM control signal takes the place of a standard FIM control signal to at least partially mitigate a likelihood of a significant rear impact collision at the host vehicle by the rear object. Whether a rear impact collision is "significant" may be determined in one of a number of ways. In one example, if the rear collision speed (i.e., the difference in speed between the host vehicle and the rear object at the time of collision) is calculated to be above 5 m/s, the rear impact collision is deemed to be significant, such that it may be desirable to use a modified FIM control signal as opposed to a standard FIM control signal to control one or more aspects of the FIM system. In another embodiment, a significant rear collision speed is between 5 m/s and 15 m/s, inclusive. One way in which to determine whether a rear impact collision is significant is by looking at typical following distances at various host vehicle speeds for a given following time. FIG. 3 illustrates a plot 200 of typical following distances at various vehicle speeds at a 1 second following time (e.g., the ratio of host vehicle speed and following distance is 1:1). At cross section 202, which is depicted in FIG. 4, a significant rear collision speed is between 5 m/s and 15 m/s. The significant rear collision speed may be at least partially dependent upon the speed of the host vehicle, with a faster host vehicle speed resulting in an increased significant rear collision speed at increased following distance. This trend is depicted in the cross sections illustrated in FIGS. 5-7 which illustrate a host vehicle speed of 20 m/s, 25 m/s, and 30 m/s, respectively, with the significant rear collision speed circled in FIGS. 6 and 7. As described above, if the following distance and host vehicle speed indicate that a rear collision speed is between 5 m/s and 15 m/s, inclusive, as shown in FIGS. 6 and 7, it can be determined that a significant rear collision may occur. Additionally, in one embodiment, although not necessarily applicable to all embodiments, the rear impact collision may not be "significant" if the rear object has one or more imminent steering options. Imminent steering options may be determined with object detection sensors (e.g., sensors 28, 30) to determine whether there is an obstruction to the left and/or right of the host vehicle and/or the rear object. As will be detailed with regard to steps 116 and 118, if there is an impending significant rear collision, the modified FIM control signal may be used.

Figure 8:
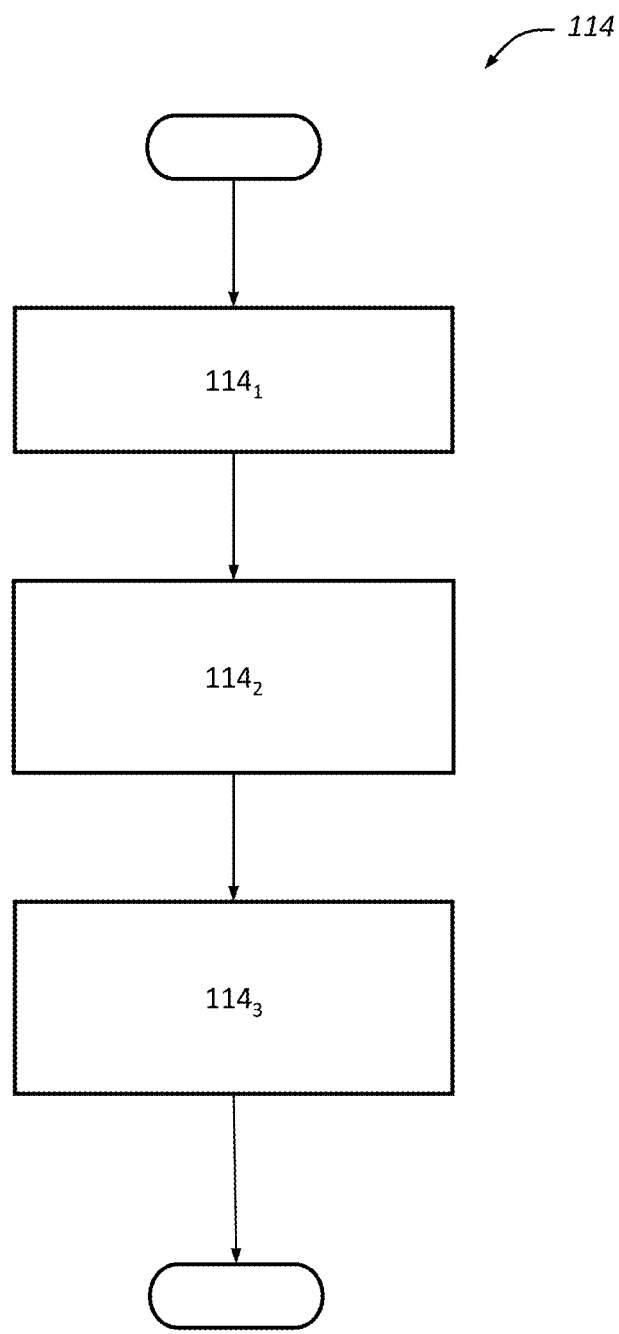
FIG. 8 is a flowchart illustrating an exemplary embodiment of a developmental step of the method illustrated in FIG. 2.
Figure 9:
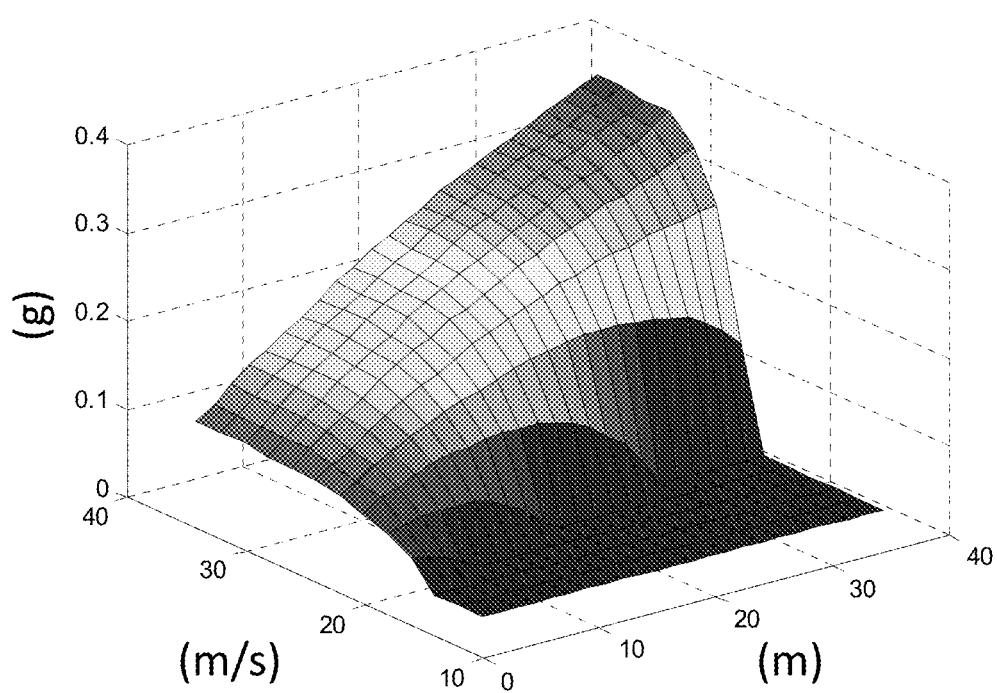
FIG. 9 is an optimization graph which compares a host vehicle speed and a distance that a rear object trails the host vehicle.

Returning to step 114, the method may use the host vehicle speed and the rear object distance to develop a modified FIM control signal. FIG. 8 shows one example of step 114, which involves various substeps that may be used when the FIM control signal is or uses a TTC value. Substep $114_1$ involves determining a deceleration adjustment parameter based on host vehicle speed and following distance. In one example, this substep may be accomplished via an optimization graph which compares the host vehicle speed and the following distance of the trailing rear object to determine a deceleration adjustment parameter in the form of a maximum allowed deceleration adjustment, as shown in FIG. 9. The goal in this embodiment is a minimum amount of deceleration adjustment (e.g., 0 g), while minimizing the hazard of the host vehicle getting rear ended by the trailing rear object. In this particular example, the deceleration adjustment parameter is an absolute value; however, it may take various other forms, such as a factor, ratio, etc. that is used to adjust the maximum level deceleration (e.g., 1 g). In substep $114_2$, the maximum level deceleration $a_{r,max}$ is adjusted using the deceleration adjustment parameter in order to obtain an adjusted deceleration value $a_{r,adj}$. In this particular example, since the deceleration adjustment parameter is an absolute acceleration value, it can be subtracted from the maximum level deceleration $a_{r,max}$ to obtain the adjusted deceleration value $a_{r,adj}$. Substep $114_3$ uses the adjusted deceleration value $a_{r,adj}$ to calculate a modified TTC to be used as the modified FIM control signal. This may be accomplished with the following equation:

$$TTC_{mod} \geq \frac{-\dot{r}_0}{a_{r,adj}} \qquad \text{(Equation 5)}$$

As with Equation 4 above, it is desirable to keep the TTC at or above this threshold in Equation 5 to both deal with an impending collision with a leading obstacle and decreasing the likelihood of an impending significant rear collision. FIG. 10 illustrates a graph that may be alternatively used to obtain a modified TTC ($TTC_{mod}$) for a given adjusted deceleration value ($a_{r,adj}$). Again, in this particular example of step 114, the modified FIM control signal is a modified TTC value; however, other FIM control signals, such as the amount of brake force to be applied, may be developed in this step. Other examples are certainly possible.

Returning to FIG. 2 and the method 100, step 116 asks whether the modified FIM control signal will at least partially mitigate a likelihood of a significant rear impact collision at the host vehicle by the rear object. If the modified FIM control signal will not at least partially mitigate the likelihood of such a rear impact collision, for example, if there is no likelihood of a rear impact collision or if such collision will not be significant, then the method returns to step 108 to use the standard FIM control signal to control one or more aspects of the FIM system. If the modified FIM control signal will at least partially mitigate the likelihood of a significant rear impact collision, the method moves to step 118 and the modified FIM control signal is used to control one or more aspects of the FIM system.

As addressed above with regard to step 108, step 118 controls one or more aspects of the FIM system; however, this step uses the modified FIM control signal instead of the standard FIM control signal. The aspects of the FIM system 12 which are controlled in step 118 will likely depend on the type of FIM control signal that is developed. According to one embodiment, the modified FIM control signal is, uses, or includes a modified TTC used by one or more aspects of the FIM system 12. The modified TTC may be used to determine when or what warnings will be issued to the driver, such as via warning device 40. The modified TTC may be used to determine when to activate a CIB feature. In determining when and/or how the brakes are applied, such as via brake control unit 52 (e.g., by initiating a brake pre-fill to increase brake pressure, activating autonomous braking, brake assist, or pre-brake, etc.), the FIM system 12 will usually evaluate the TTC, and in some instances, the amount of impact speed reduction that is desired. Typically, the brake force applied is constant (e.g., 1 g) and is applied at or below a certain TTC threshold. Further, typical CIB features are designed so as to avoid intrusiveness, by activating braking once the TTC threshold is established (e.g., applying 1 g or a max braking level at a minimum time that the host vehicle driver can decelerate or steer to avoid the collision). However, it is possible for the modified FIM control signal to be an adjusted amount of brake force instead of applying a constant brake force at or below the TTC threshold. Like the example provided above, the modified FIM control signal, which in this embodiment, would consist of an amount of brake force, may be obtained by adjusting the maximum level deceleration adjustment by a deceleration adjustment parameter as described with respect to step 114. Other examples of modified FIM control signals are certainly possible; this includes control signals that do and do not include TTC values. In one example, the modified FIM control signal may be adjusted by one or more sensitivity attributes, such as using left and/or right lane object detection and/or road edge or road edge features such as side barriers (e.g., via sensor readings from object detection sensors 28, 30) to determine if the rear object has imminent steering options. If the rear object has imminent steering options, the likelihood of a rear collision may not be significant, and as such, the standard FIM control signal may be used.

FIGS. 11-15 are still shots of an animation comparing use of a standard FIM control signal (FIGS. 11A, 12A, 13A, and 14A) and a modified FIM control signal (FIGS. 11B, 12B, 13B, 14B, and 15) that are used with a CIB feature of an FIM system. The figures illustrate the host vehicle 10, a leading obstacle 70, and a trailing rear object 80. In both examples, the host vehicle speed starts at 30 m/s, the distance that the rear object 80 trails the host vehicle 10 is 30 m, and the rear object includes CIB braking at 1 g with a CIB TTC of 2 s. With the standard FIM control signal (FIGS. 11A, 12A, 13A, and 14A), the host vehicle is braking at a maximum deceleration level of 1 g at t=−1.6 s to avoid front impact with the leading obstacle 70. With the modified FIM control signal (FIGS. 11B, 12B, 13B, 14B, and 15), the host vehicle instead brakes at a level of 0.7 g at t=−2.23 s to avoid the front impact with the leading obstacle 70. FIGS. 11A and 11B show a still shot of the animation at 4.0 s; FIGS. 12A and 12B show a still shot of the animation at 5.0 s; FIGS. 13A and 13B show a still shot of the animation at 6.0 s; and FIGS. 14A and 14B show a still shot of the animation at 6.4 s. As can be seen in FIG. 14A, with the standard FIM control signal, there is a significant rear impact collision (e.g., the difference of the host vehicle speed (HV speed) and the rear object speed (FV speed) is 10 m/s). FIG. 15 shows that with the modified FIM control signal, when both the rear object and the host vehicle have stopped (t=7.3 s), there is no rear impact collision.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating a front impact mitigation system of a host vehicle, comprising the steps of:
    receiving a host vehicle speed signal at a control unit that is representative of a host vehicle speed;
    receiving a rear object distance signal at the control unit that is representative of a distance that a rear object trails the host vehicle; and
    using the host vehicle speed signal and the rear object distance signal to develop a modified front impact mitigation control signal at the control unit, wherein the modified front impact mitigation control signal is modified from a standard front impact mitigation control signal to at least partially mitigate a likelihood of a significant rear impact collision at the host vehicle by the rear object during operation of the front impact mitigation system.

2. The method of claim 1, further comprising the step of determining a deceleration adjustment parameter based on the host vehicle speed and the distance that the rear object trails the host vehicle.

3. The method of claim 2, further comprising the step of adjusting a maximum level deceleration of a crash imminent braking feature of the front impact mitigation system using the deceleration adjustment parameter to obtain an adjusted deceleration value.

4. The method of claim 3, further comprising using the adjusted deceleration value to calculate a modified time-to-collision value to be used as the modified front impact mitigation control signal.

5. The method of claim 4, wherein the modified time-to-collision value is less than the standard time-to-collision value.

6. The method of claim 2, wherein the deceleration adjustment parameter is determined by using data from an optimization graph which compares the host vehicle speed and the distance that the rear object trails the host vehicle.

7. The method of claim 1, further comprising the step of comparing the modified front impact mitigation control signal to the standard front impact mitigation control signal.

8. The method of claim 7, wherein the modified front impact mitigation control signal is used to control one or more aspects of the front impact mitigation system when the modified front impact control signal at least partially mitigates a likelihood of a significant rear impact collision at the host vehicle by the rear object.

9. The method of claim 8, wherein the modified front impact mitigation control signal is used to control a crash imminent braking feature of the front impact mitigation system.

10. The method of claim 9, wherein the modified front impact mitigation control signal causes a braking unit to decelerate the vehicle at a slower rate.

11. The method of claim 1, wherein a significant rear impact collision is defined by a rear collision speed between the rear object and the host vehicle between 5 m/s and 15 m/s, inclusive.

12. The method of claim 11, wherein the host vehicle determines whether the rear object has one or more imminent steering options to confirm the significant rear impact collision.

13. The method of claim 12, wherein the standard front impact control signal is used to control one or more aspects of the front impact mitigation system when the rear object has one or more imminent steering options.

14. A front impact mitigation system for a host vehicle, comprising:
a host vehicle speed sensor configured to determine a host vehicle speed;
an object detection sensor configured to determine a distance that a rear object trails the host vehicle; and
a control unit coupled to the host vehicle speed sensor and the object detection sensor and configured to develop a modified front impact mitigation control signal based at least partially on the host vehicle speed and the distance that the rear object trails the host vehicle, wherein the modified front impact mitigation control signal is modified from a standard front impact control signal to at least partially mitigate a likelihood of a significant rear impact collision at the host vehicle by the rear object during operation of the front impact mitigation system.

* * * * *